Dec. 24, 1935.    J. E. PRESTON    2,025,246
MACHINE FOR FOLDING AND CLASSIFYING TOWELS, ETC
Filed Nov. 16, 1933    7 Sheets-Sheet 1

INVENTOR
JOHN E. PRESTON,
BY
ATTORNEY

Dec. 24, 1935.  J. E. PRESTON  2,025,246
MACHINE FOR FOLDING AND CLASSIFYING TOWELS, ETC
Filed Nov. 16, 1933  7 Sheets-Sheet 3

INVENTOR- JOHN E. PRESTON,
BY ATTORNEY.

Dec. 24, 1935.   J. E. PRESTON   2,025,246
MACHINE FOR FOLDING AND CLASSIFYING TOWELS, ETC
Filed Nov. 16, 1933   7 Sheets-Sheet 4
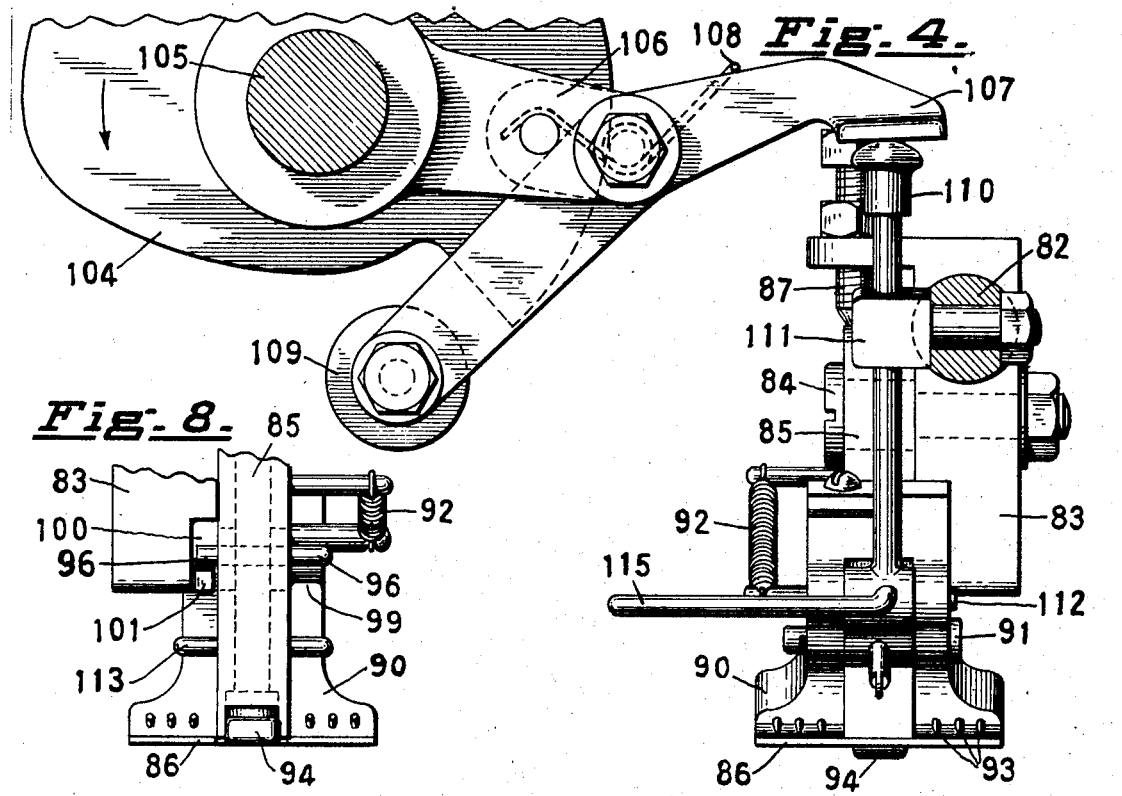
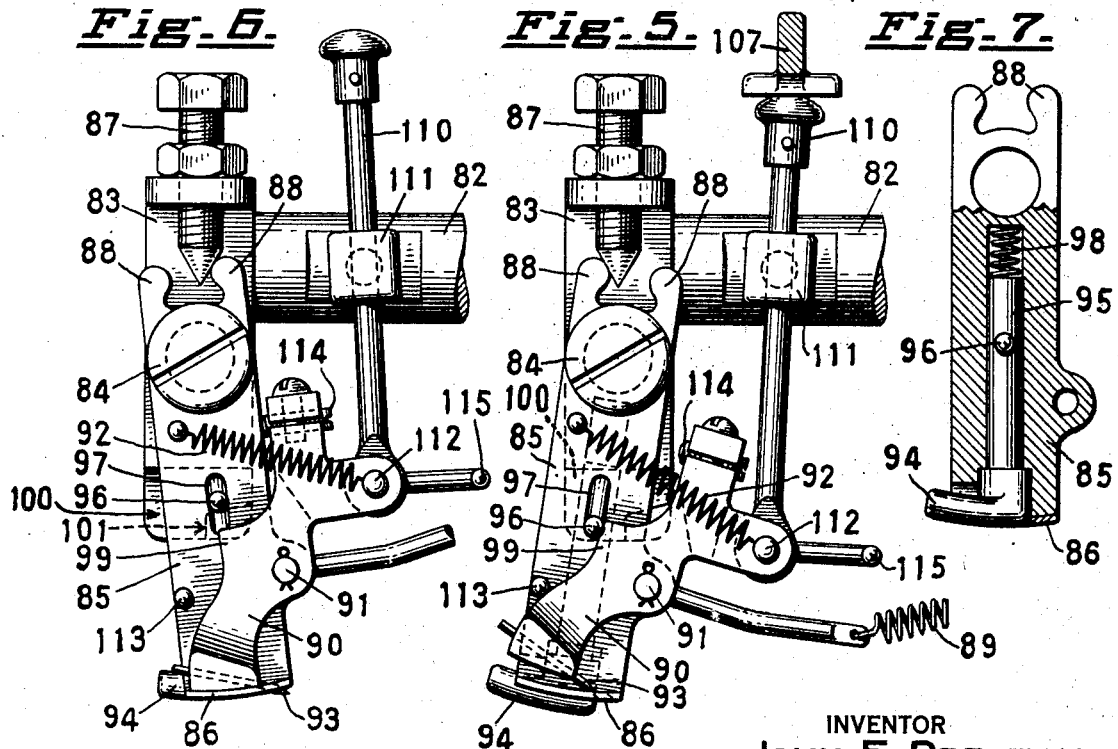
INVENTOR
JOHN E. PRESTON,
BY
ATTORNEY Dec. 24, 1935.  J. E. PRESTON  2,025,246
MACHINE FOR FOLDING AND CLASSIFYING TOWELS, ETC
Filed Nov. 16, 1933  7 Sheets-Sheet 5
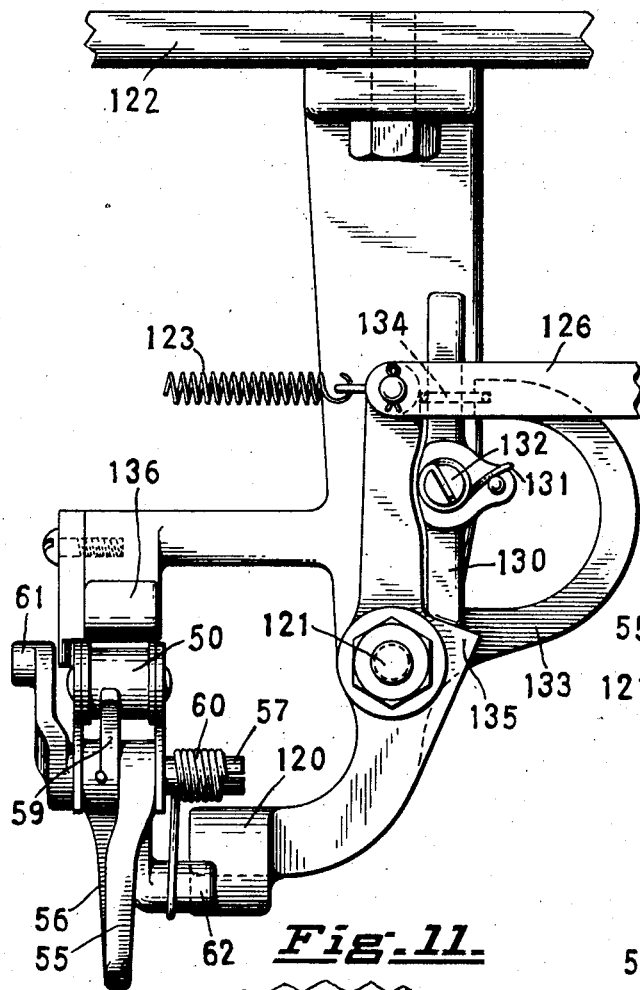
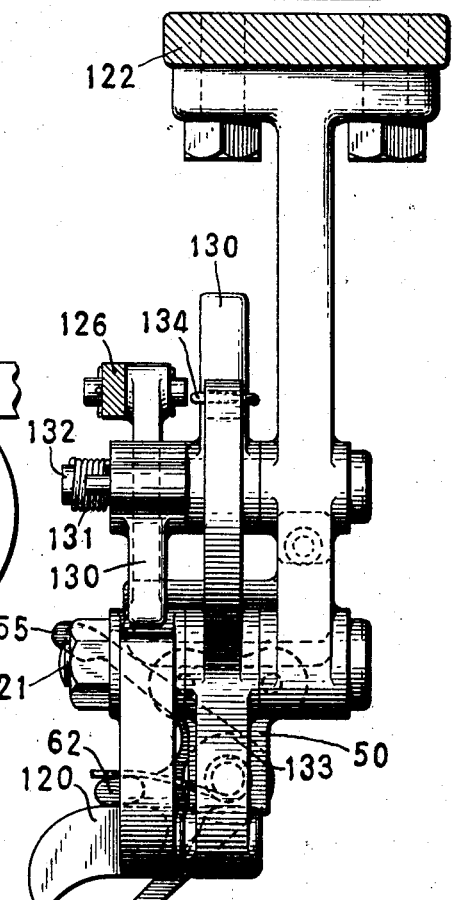
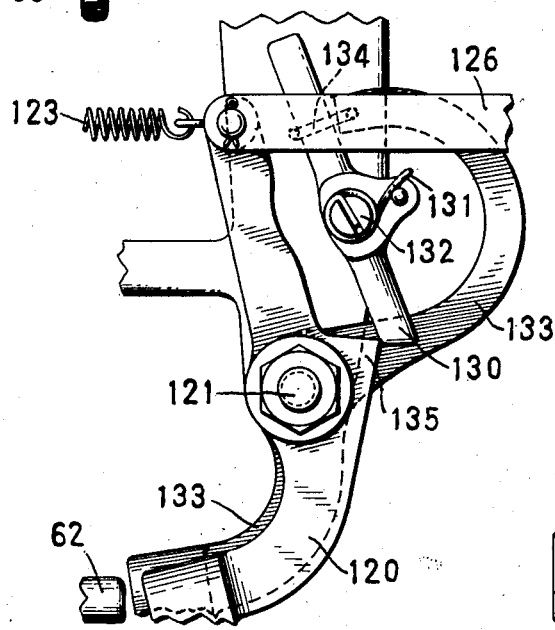
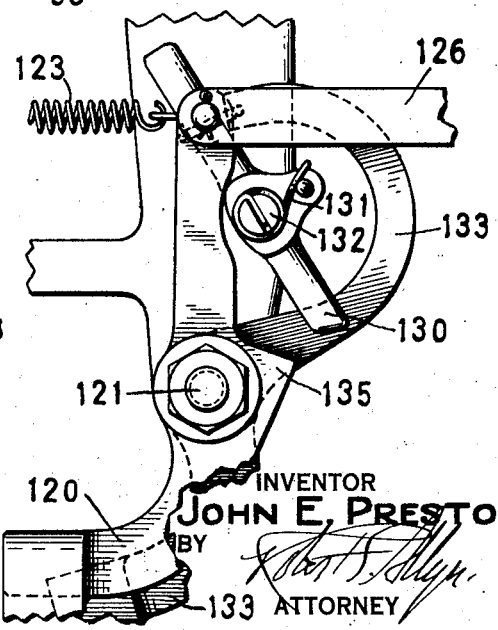
INVENTOR
JOHN E. PRESTON,
BY
ATTORNEY Dec. 24, 1935.    J. E. PRESTON    2,025,246
MACHINE FOR FOLDING AND CLASSIFYING TOWELS, ETC
Filed Nov. 16, 1933    7 Sheets-Sheet 6
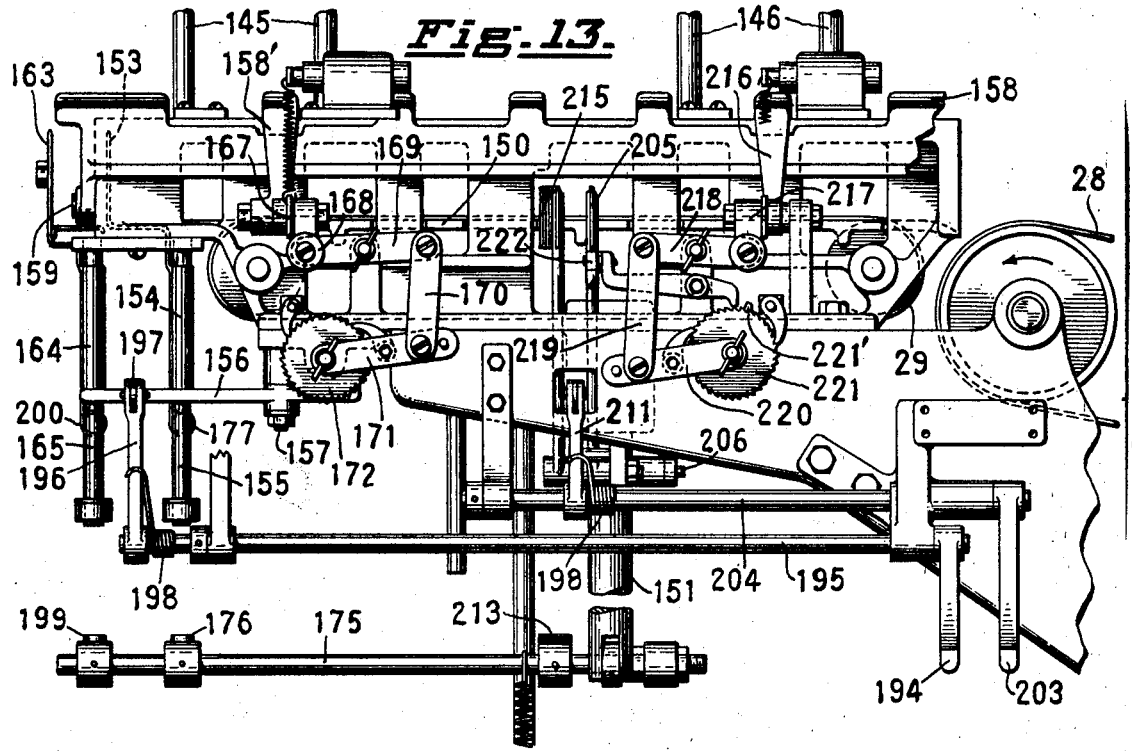
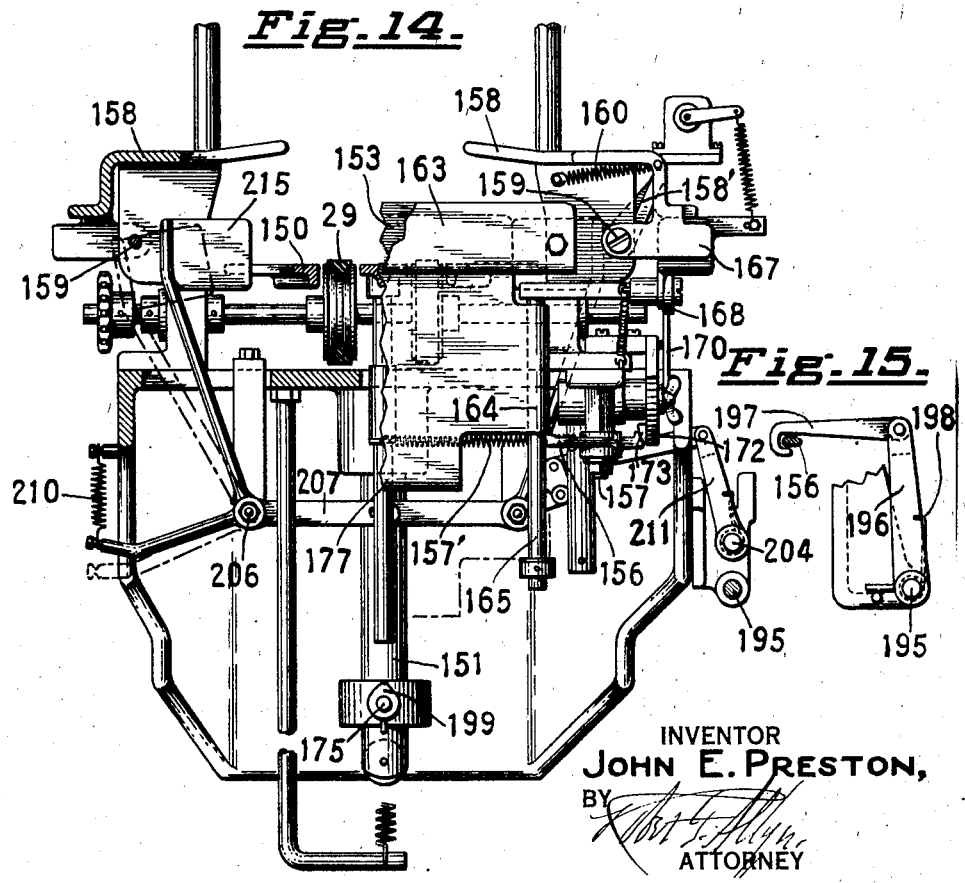
INVENTOR
JOHN E. PRESTON,
BY
ATTORNEY Dec. 24, 1935. J. E. PRESTON 2,025,246
MACHINE FOR FOLDING AND CLASSIFYING TOWELS, ETC
Filed Nov. 16, 1933 7 Sheets-Sheet 7
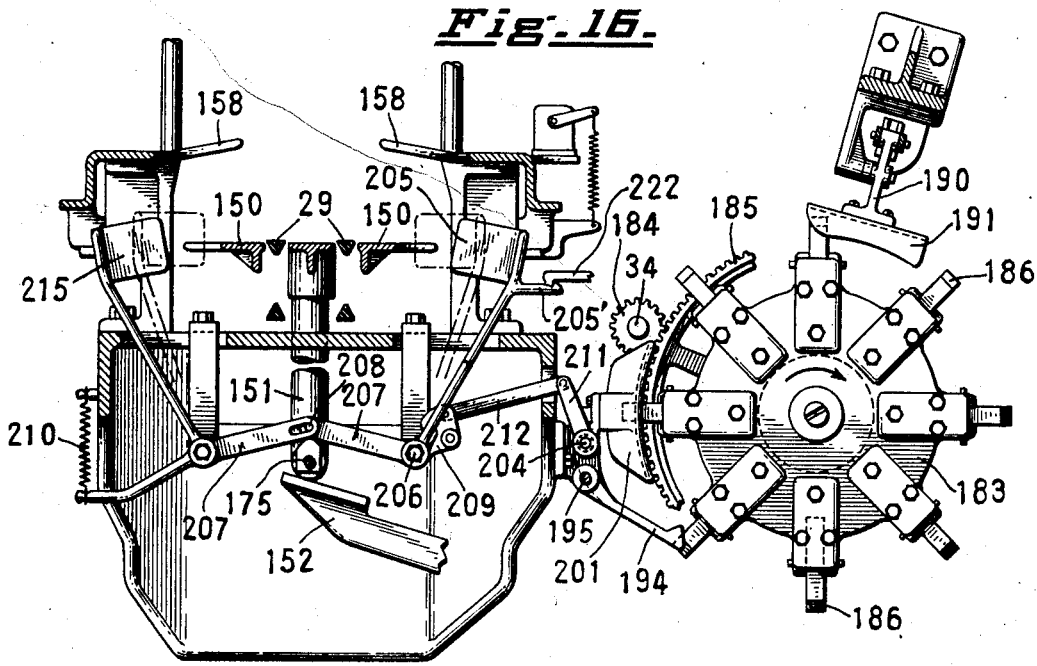
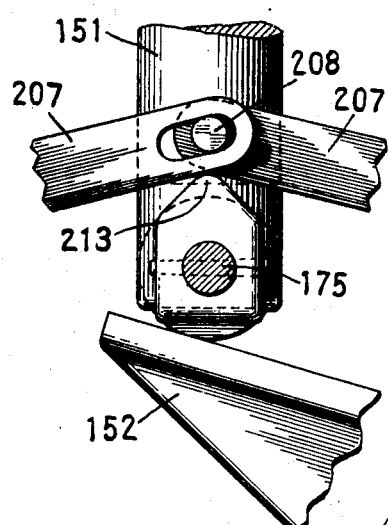
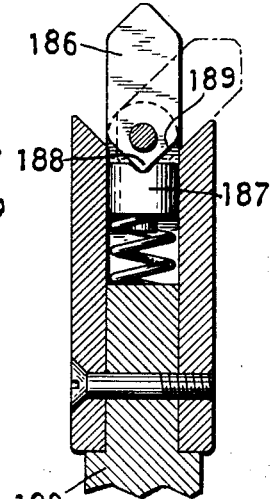
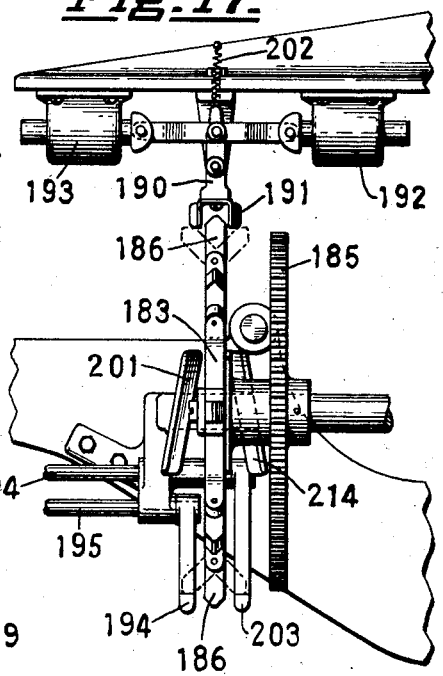
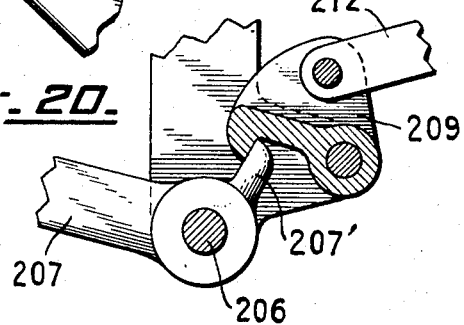
INVENTOR
JOHN E. PRESTON,
BY
ATTORNEY Patented Dec. 24, 1935

2,025,246

UNITED STATES PATENT OFFICE 2,025,246

MACHINE FOR FOLDING AND CLASSIFYING TOWELS, ETC.

John E. Preston, Newark, N. J.

Application November 16, 1933, Serial No. 698,303

20 Claims. (Cl. 270—62)

My invention relates particularly to machines for folding and sorting comparatively small articles of cloth and especially towels. The particular purpose for which the articles are used, however, is of course unimportant. For convenience, therefore, and without intending to limit the invention the articles may be termed towels.

Apparatus of this kind is especially useful in laundries where it is necessary to handle towels in whatever condition they happen to come from the washing and ironing operation. Frequently the towels are stained or imperfectly washed or torn. The main object, therefore, of my present invention is to provide a folding machine of a suitable character with means for separating the various grades or conditions of towels. This operation is commonly termed classifying. The different grades customarily recognized are, first, wash-overs which for some reason or other must go back to the wash room; second, such towels as are of an inferior quality or condition commonly termed seconds; third, those towels which are in first class condition, commonly termed firsts; and, last, towels which have become so damaged or torn that they can not be used again without mending or which may be so badly torn as to be of no further use as towels.

These various classifications are determined by inspection by the operator and I have therefore provided means by which the operator can separate in a machine these various grades or classes without stopping the operation of the machine and without any handling on the part of the operator.

Each of the towels classified as above set forth is counted as it passes through the machine so that a record can be kept of the number of various grades or classes. I may also arrange the first and second grade towels in stacks convenient for bundling in packages of a predetermined number.

I have also preferably provided means for removing from the machine such towels as may become jammed in the folding operation.

The machine is designed for continuous operation and being electrically driven is under the control of the operator who can stop the machine at any time. The starting and stopping of the machine is preferably accomplished by a foot control switch and the classification or sorting of the various grades of towels is effected by a number of hand actuated switches.

One form of folding mechanism will be found shown in detail in Patent 1,858,565, dated May 17, 1932. Furthermore improvements in similar types of folding mechanism will be found in application 565,280 filed September 26, 1931.

My application 660,484, filed March 13, 1933, shows further improvements in one form of folding mechanism together with means for automatically feeding towels to the folding mechanism.

My present invention utilizes similar feeding means and constitutes improvements in the mechanism for picking up successive towels as well as means for classifying or sorting the various grades above referred to. The classifying or sorting actions are accomplished by electromagnetic devices, whose operation is controlled by a number of push buttons or other suitable type of hand or finger actuated switches.

The towels are picked up by devices which are automatically oscillated to successively carry the front edge of a towel to the feeding grippers and chains which are so arranged as to turn over each towel so that the operator can inspect both sides of it. If the operator determines that a towel requires a rewash, a switch is actuated which causes the release of that towel in such a position that it can fall or will roll clear of the stack of towels and be deposited on the floor or in some suitable receptacle. If the towel is in a suitable condition to be folded it is allowed to continue to the folding mechanism. If, however, the towel is of the second grade condition it is caused to be stacked automatically in a stack of second grade towels after it has been folded. The feeding of the folded towel into this stack is controlled by a delay action mechanism which is set by the operator at the instant of the inspection of the towel as it goes into the machine.

If the towel is of the first grade condition it is automatically carried past the first stack to a second stack. If, on the other hand, the towel is torn the operator sets a discarding device which is brought into action at a later time so that the torn towel is carried through the machine without being stacked with either the first or second grade towels and ejected to any suitable receptacle or if desired to a subsequent stacking device.

It will be obvious as the specification proceeds that this classification can be broken down into three or more stacking stages by the use of similar principles of construction and operation.

I also provide means for automatically clearing from the folding devices towels which may become jammed and would otherwise interfere with the operation of the machine.

Fig. 4 is a side view showing one of the pick-up devices and the elements which support it.

Fig. 5 is a detail elevation of one of the pick-up devices showing it in its normal inoperative position.

Fig. 6 is a similar view but showing the pick-up in its operative position.

Fig. 7 is a detail view of a part of one of the pick-up devices.

Fig. 8 is a fragmentary detail view of one of the pick-up devices.

Fig. 9 is a detail view of one of the ejectors for discarding and ejecting a towel which has to be washed over, showing the parts in the operative position, and in conjunction with one of the towel feeding grippers.

Fig. 10 is an edge view of the same.

Fig. 11 is a detail view of the ejector and selecting mechanism in the inoperative position.

Fig. 12 is a similar view in an intermediate position.

Fig. 13 shows part of the stacking and counting mechanisms looking at the parts on the opposite side of that shown in Fig. 3.

Figure 1:
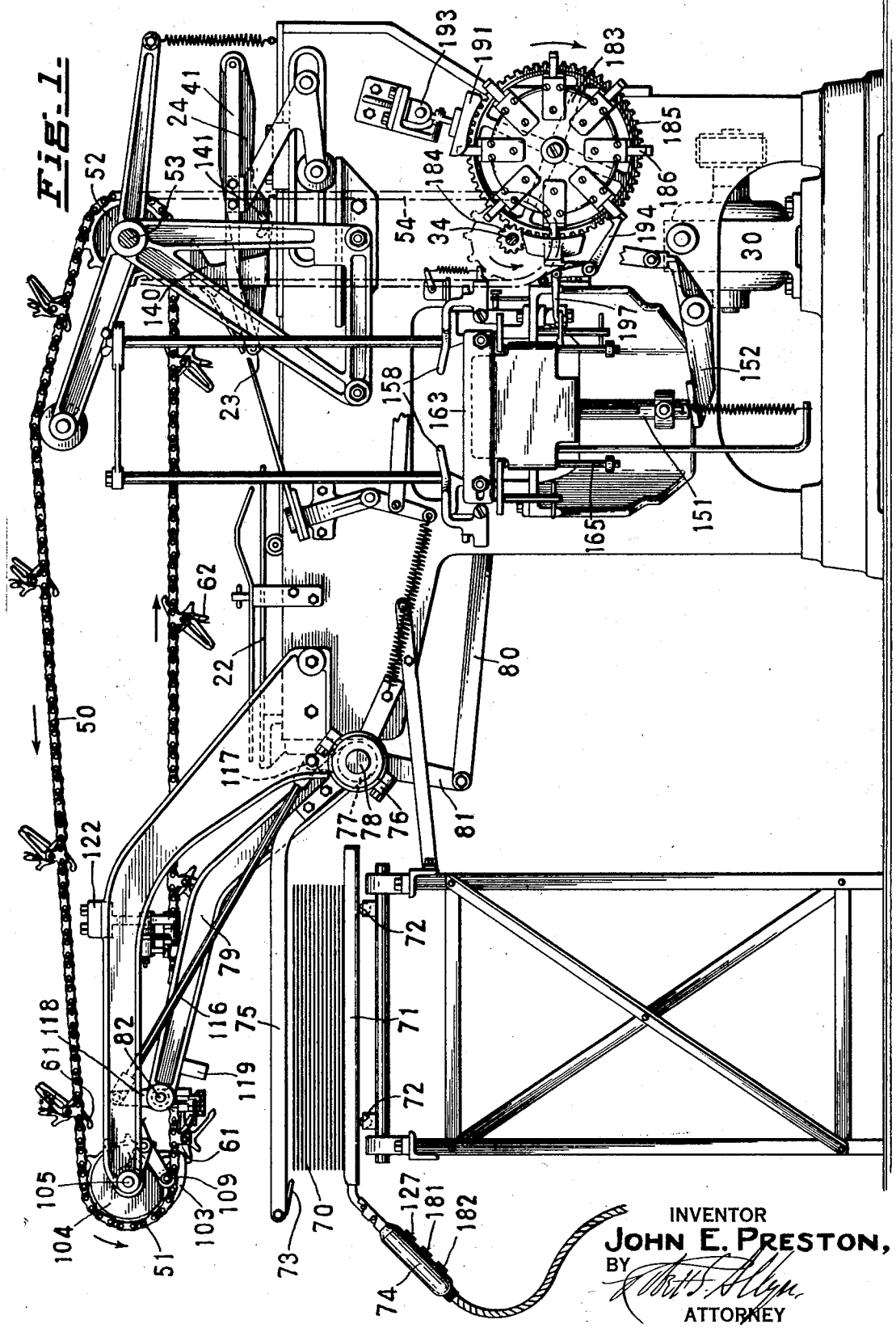
Fig. 1 is a vertical longitudinal section and side elevation of mechanism embodying some of the features of my invention.

Fig. 14 is an end view and partial section of the parts shown in Fig. 13 showing the selecting mechanism for the first and second grade towels. This shows at the right the mechanism associated with the selection of the first grade towels and at the left the mechanism associated with the selection of the second grade towels. This figure also shows part of the mechanism for controlling the ejection of the torn towels.

Fig. 15 is a fragmentary detail of part of the ejector mechanism for the torn towels.

Fig. 16 is a transverse sectional view showing the time delay mechanism for selecting the second grade and the torn towels and showing at the left in section the mechanism for selecting the second grade towels.

Fig. 17 is a fragmentary side view of the time delay selecting mechanism.

Fig. 18 is an enlarged fragmentary detail of parts of the stacking mechanism.

Fig. 19 is an enlarged sectional view of a detail of the time delay device.

Fig. 20 is an enlarged fragmentary detail view of the trigger action for controlling the operation of the second grade selector.

While the invention relates particularly to the pick-up feeding and classifying mechanism, I have designed it particularly to be used with folding mechanism of the type previously mentioned. While I do not wish it understood that the invention is limited to such a type of folding machine, it finds especial utility in connection therewith and will therefore be for convenience described with respect to such folding mechanism. It should be understood, however, that the claims are not intended to be limited to a particular type of folding machine except as specified therein.

In the form shown the machine has a stationary table top 21 with a plate 22 which is automatically reciprocated over the table top to fold the front edge of the towel over the central portion of the towel, as set forth in the above mentioned Patent 1,858,565. The opposite edge of the towel is folded over the central portion by means of a reciprocating rod 23. Edge gripping and holding devices are also provided in this type of machine, as set forth in said patent. After the towel has been folded along longitudinal lines by means of the plate 22 and the rod 23, it is centrally creased by means of a swinging member 24, as set forth more fully in my application 660,484. This creasing device serves to tuck a central fold of the towel in between the rollers 25, 25 which carry the partially folded towel downwardly into the guide chute 26.

The horizontally oscillating member 27 is adapted to pass through an opening in the chute 26 to engage the partially folded towel which is in the chute and complete the folding action and deliver the folded towel onto the conveyor belt 28, from whence it is delivered onto the belts 29, which will be later described in connection with the stacker.

The entire mechanism is adapted to be driven from an electric motor 30 which is belted to the member 31 of the conventional worm gear drive 32 for the shaft 33. The shaft 33 drives the shaft 34 through gears 35. This shaft 34 carries cams 36 and 37 for actuating the arms 38 and 39 which are connected respectively to the links 40 and 41 which actuate respectively the folding plate 22 and the folding bar 23. Between the rollers 25 and the chute 26 is arranged an arm 42 which is pivoted at 43 and connected at 44 to the link 40 or some part of the plate 22 so that as the plate 22 is reciprocated the arm 42 is swung back and forth between the rollers 25 and the top of the chute 26. In case, therefore, a towel gets jammed into the top of the chute 26 the arm 42 will knock it out so that it will fall on the floor or into some suitable receptacle, thus leaving the chute clear and preventing the stopping of the machine.

The details of the driving mechanism will be found more fully set forth in my application 660,484.

The cam 45 is driven from the shaft 33 by any suitable train of gears and coacts with a roller 46 on the link 47 which is connected to the parallel motion links 48 which carry the folding member 27. The roller 49 rests on the top of the conveyor 28 so that the movement of the folding member 27 tucks the folded towel between the roller 49 and the conveyor 28 which thus carries the towels successively to the stacking mechanism.

It will be understood that this folding mechanism actuates continuously and folds the towels which are successively delivered to it at properly timed intervals.

The feed chains 50 operate on sprockets 51 and 52 which are arranged above the folding mechanism. The sprockets 52 are carried by a shaft 53 which is driven from the shaft 34 by a chain 54 and suitable sprockets.

Each chain 50 carries a number of pairs of gripping jaws which are arranged to grip the edges of the towels to be folded and carry them successively to the folding mechanism. Each pair of jaws and its associated parts constitutes a gripping device having jaw members 55 and 56 which are pivotally mounted on a pin 57 carried by the chain. The jaw member 55 has a projecting lug 58 and the jaw member 56 has a lug 59 and these lugs are adapted to engage the chain to limit the swinging movement of the gripping devices. The spring 60 on the pin 57 serves to press the tips of the two jaw members together. The jaw member 55 is loose on the shaft 57 and the jaw member 56 is pinned to the shaft.

The shaft also has an extension arm 61 which is pinned to it and by means of which the jaw member 56 can be moved away from the jaw member 55 for the purpose of releasing the towel. The lug 62 which is integral with the jaw member 55 also serves as a means for actuating the jaw member 55 to open the device when the lug 62 meets an abutment, as will hereinafter be described.

The towels 70 or other articles to be folded are brought to the machine in a stack and for convenience supported on a moving platform or tray 71, which in turn may be supported on ball bearings or roller bearings 72 arranged at the front of the machine beneath the chains 50, 50 where the towels may be picked up successively and grasped by the grippers, previously described, and carried to the folding mechanism.

In order to facilitate the placing of the towels in their proper position and consequently picking them up in a uniform manner I provide a gauge 73 which extends across the front of the machine and serves as a locating device. The tray 71 is provided with one or more handles such as 74 by which the tray is manipulated to bring the front edge of the top towel into a predetermined alignment or position with respect to the edge of the gauge 73. This adjustability of the tray with respect to the gauge is desirable because of the fact that the towels when stacked are seldom arranged with exact uniformity and it is therefore easier to move the stack of towels with respect to the gauge than it is to move an individual towel with respect to the gauge and much easier than it is to attempt to stack the towels accurately.

The gauge 73 is carried by a pair of arms 75, each of which is provided with a strap 76 which is frictionally supported on a bearing 77 which is supported on the shaft 78. This bearing is held from rotation in any suitable manner and the strap 76 is adjustable so as to vary the frictional resistance to its rotation on the bearing. The adjustment of the bearing is such that the gauge is held in any position to which it may be moved, so that the gauge may be lifted up out of the way of the stack if desired and may also be moved downwardly to the level of the top towel on the stack.

While it is possible to pick up the towels from the stack and insert them by hand into the feeding grippers, it is desirable to perform the pick-up operation automatically according to the principles set forth in my application 660,484. The present pick-up devices, however, embody certain improvements over those of my former application and will be later described.

A pick-up device is mounted on each side of the machine and carried by an arm 79 fixed on the shaft 78. The shaft 78 is rocked back and forth by a link 80 and arm 81 which are driven in any suitable manner, as for instance set forth in my application 660,484, the time corresponding with the speed of the feed chains 50 so that the pick-up devices will bring the edges of successive towels into proper position for consecutive gripping by the successive pairs of grippers.

Each pick-up device has a shaft 82 which is supported by one of the arms 79. A block 83 fixed on the inner end of the shaft 82 has a pivot pin 84 which supports a swinging arm 85 on the lower end of which is a foot plate 86. The lateral swinging of the arm 85 is limited by the adjustable screw 87, the end of which is adapted to be extended more or less into the space between the lugs 88, 88. The arm 85 is under tension of a spring 89 which tends to draw the lower end of the arm 85 outwardly from the center of the machine. Each arm 85 carries a pick-up lever 90 which is hinged at 91 and always held under tension of the spring 92 which connects the upper end of the lever 90 with an adjacent part of the arm 85. The bias of the spring tends to cause the lower end of the lever 90 with its attached needle points 93 to move outwardly away from the center of the machine and the foot plate 86 is provided with perforations to permit the protrusion of the needle points at the proper time. A latch member 94 is carried by the lower end of a rod 95 which slides in the arm 85 and is provided with a pin 96 which is adapted to slide up and down in the slot 97 in the arm 85. The plunger 95 is normally under pressure of the spring 98 which tends to move the latch downwardly.

Fig. 5 shows what may be termed the normal retracted or raised position of the right hand pick-up device.

In this position the lever 90 is held with the needle points 93 retracted above the foot plate 86 by reason of the engagement of the shoulder 99 with the pin 96. When the pick-up device descends the foot 94 of the latch engages the top of the stack of towels and compressing the spring 98 releases the pin 96 from the shoulder 99 so that the spring 92 is free to tilt the lever 90 about its pivot and project the needle points 93 downwardly and outwardly through the foot plate 86 to engage the top towel near the edge thereof. The inner end of the pin 96 is movable in a slot 100 in the block 83. A projection or shoulder 101 limits the swinging movement of the arm 85 and the pin 96 until the plunger 95 has moved upwardly sufficiently to permit the inner end of the pin 96 to clear the projection 101, whereupon the spring 89 pulls the lower end of the arm 85 with the attached pick-up lever and needles so as to stretch the towel laterally, it being understood, of course, that at the left hand side of the machine is located a pick-up device exactly like the one described but with the pick-up needles and associated parts arranged to move toward the left at the same time that the needles of Fig. 5 move toward the right.

Fig. 6 shows the position of the right hand pick-up device when it has acted to stretch the towel to its full extent, at which time the pin 96 is held above the projection 101. It will be noted that the swinging movement or lateral throw of the pick-up arm 85 is limited by the screw point 87 between the lugs 88.

The pick-up devices above described bring the front edges of successive towels into position to be grasped by the gripping jaws. As previously described, each gripping device is provided with an arm 61 by which the jaw 56 can be separated from the jaw 55 to provide an opening for the front edge of the towel as the gripping device approaches the edge of the towel which is being held by the pick-up devices. This opening movement of the jaws is effected by the engagement of the arm 61 with a stationary cam-like member 103 which gradually opens the jaws to the position shown in Fig. 1.

As the feed chains continue to travel the jaws of the gripping device pass respectively above and below the edge of the towel and the arm 61 slips off from beneath the point of the cam 103 and the spring 69 shuts the jaws, so that they grip the towel and carry it toward the folding mechanism.

Just as the grippers engage the edge of the towel the pick-up needles 93 are retracted and stripped from the towel by the foot plate 86. This release or stripping action is effected by mechanism shown in Figs. 1 and 4.

A cam 104 rotates with the sprocket 51 on the stationary shaft 105. An arm 106 is fixed on the shaft 105 and carries a lever 107 which is pivoted to the arm and held under tension of the spring 108 and provided with a roller 109 adapted to be engaged by the cam 104 to oscillate the lever in opposition to the spring.

A push rod 110 is loosely guided in a block 111 carried by the shaft 82 and has its lower end connected to the hinge pin 112 in the pick-up lever 90. When the pick-up device has been raised to the upper position shown in Fig. 1, the upper end of the push rod 110 comes into position beneath the outer end of the lever 107. The cam 104 is designed and timed to raise the free end of the lever 107 upwardly and then release the roller 109 so that the spring 108 can apply a resilient blow through the end of the lever 107 against the upper end of the push rod 110 just as the gripping jaws have engaged the towel. This action of the push rod 110 moves the lever 90 from the position shown in Fig. 6 to the position shown in Fig. 5, during which movement the shoulder 101 is tilted to the right of the pin 96 and the arm 85 is swung to the left. The pin 113 serves as a stop for the lever 90 in this movement. The adjustable set screw 114 serves as an abutment for the lever 90 in its opposite swinging movement and thus serves to regulate the amount of projection of the needle points 93 through the foot plate 86.

It will be seen that as the arm 85 swings toward the left, as shown in Fig. 5, the pin 96 will be disengaged from the upper edge of the projection 101 and the spring 98 will throw the plunger and its foot 94 downwardly so that the lever 90 is now latched in its retracted position and the arm 85 is at the same time latched against movement toward the right by the engagement of the inner end of the pin 96 with the projection 101.

A projection 115 may be provided, as shown in Figs. 4 and 6, to facilitate manual release of the pick-up device.

A link 116 is preferably provided and connects arms 117 and 118 which are mounted respectively on the shafts 78 and 82 to constitute, in connection with the arm 79, a parallel motion device so as to ensure maintaining the bottom of the foot plate and the associated pick-up needles in a horizontal plane substantially parallel with the top of the stack of towels. Each pick-up arm 79 is provided with a projection 119 adapted to engage an arm 75 which carries the positioning gauge 73 so as to automatically lower the gauge after each towel has been removed from the top of the stack.

It will be seen from the foregoing that as each towel is picked up by its front edge by the pick-up devices and carried to the feeding grippers, facility is provided to the operator to inspect the underside of the towel as the towel is fed into the machine. The operator then determines the classification or grade of the towel and its ultimate distribution in the machine.

Disposed adjacent each of the feed chains is a dog or stop lever 120 pivoted at 121 to a bracket supported by a crossbar 122. The details of this mechanism will be seen in Figs. 3 and 9 to 12.

A spring 123 is connected to the upper end of the lever 120 and normally holds the lower end of the lever out of the path of movement of the lugs 62 of the gripping devices, previously described. These stop levers are adapted to be actuated by suitable mechanism to bring the lower end of the lever 120 into the path of movement of the lugs 62 and force the gripping jaws apart as the chain travels toward the folding mechanism.

In the form shown the releasing stop lever is brought into action by an electro magnetic device, such as a solenoid 124 having a plunger 125 connected to the link 126 which in turn is connected to the upper end of the stop lever 120. This solenoid is energized by the closing of a circuit controlled by a push button 127 and switch in the handle 74 shown in Fig. 1.

Obviously the solenoid may be controlled either directly by the switch or indirectly through a relay as is common in the electrical art.

The solenoid is employed merely to set the stop lever 120 in position at the instant that the push button 127 is depressed. The bell crank pawl 130 is normally held in the position shown in Fig. 11, by spring 131 one end of which is secured to the stationary stud 132 on which the pawl is mounted.

The lever 133 is mounted on the same stud 121 that carries the lever 120 and has a foot which is located adjacent the foot of the lever 120. The upper end of the lever 133 is connected by a link 134 with the upper end of the pawl 130.

In the normal inoperative position of the parts shown in Fig. 11 the spring 123 holds the lever 120 out of the path of movement of the lug 62 of the conveyor grippers and the spring 131 holds the pawl lever 130 with its lower end pressing against the shoulder 135 on the lever 120. This same spring 131 through the action of the pawl lever 130 and the link 134 holds the lever 133 in the position of Fig. 11. When the operator presses the push button 127 of a switch in the handle 74, the circuit of the solenoid 124 is energized and the rod 126 pulls the lever 120 into the position of Fig. 9 so that the foot of the lever 120 stands in the path of movement of the lug 62. When the lever 120 moves from the position of Fig. 11 toward the position of Fig. 9 the pawl 130 is released from the shoulder 135 and snaps from the position of Fig. 11 to the position of Fig. 9, moving with it the lever 133 so that the foot of 133 is in alignment with the foot of 120, as shown in Figs. 9 and 10.

It will be seen that the pawl 130 has now locked the lever 120 and 133 in the position shown in Fig. 9 so that the de-energizing of the solenoid, caused by the release of the push button switch, has no effect on the release lever 120.

When the gripping jaws approach the lever 120 the lug 62 rides up the inclined lower end of the lever 120 and thus separates the gripping jaws 56 from 55 and releases the article which is being fed, which drops down onto the floor or into a receptacle which may be provided.

As the lug 62 travels along with the conveyor chain it strikes the foot of the lever 133 and as the chain is held down by the guide 136 the spring 60 presses the lug 62 downward and tilts the lever 133 from the position of Figs. 9 and 10 to the position of Fig. 12. The movement of the lever 133 releases the pawl 130 from the lever 120 as shown in Fig. 12 so that the spring 123 can pull and retract the lever 120 back to the position of Fig. 11. It will thus be seen that the operator is able to set the release stop 120 by merely depressing the push button 127, after which the article releasing and the stop resetting actions take place automatically, during which time the operator inspects and determines the disposition of the next article.

If the articles being handled are towels or the like, the ones thrown out by the action controlled by the push button 127 would be termed "washovers" because the operator has determined that these are to go back and be further processed without being folded.

It will be understood that articles which are not to be rewashed will go on into the machine and be folded by the mechanism previously described.

The release of the articles at the proper position with respect to the folding mechanism is effected by a stop 140 which is mounted on the table or frame of the machine and is adjustable longitudinally of the machine and clamped by one or more clamp nuts 141. One of these stops is mounted beneath each of the conveyor chains so that as the gripping jaws move along the lug 62 of each gripping member engages a stop 140 and is thus moved to release the article as previously described.

Articles which pass through the folding mechanism are taken by the belt 28 to the stacking mechanism which may include any number of stacks. In the present instance I have shown two stacks which may be designated as the first and second stacks 145 and 146, which are to receive what may be termed the first class and the second class towels, respectively.

We may also consider still another classification of folded towels, such for instance as those which have been torn which are permitted to pass beyond the stacker out of the machine into a suitable container for re-handling, repair, etc.

The plate 150 has openings for the belts 29 and constitutes the bottom plate of the stacker which is supported by the plunger rod 151. This plunger and the bottom plate are intermittently actuated by a lever 152 which in turn is actuated by a cam (not shown) on the main shaft 34 as described in my former application.

Figure 2:
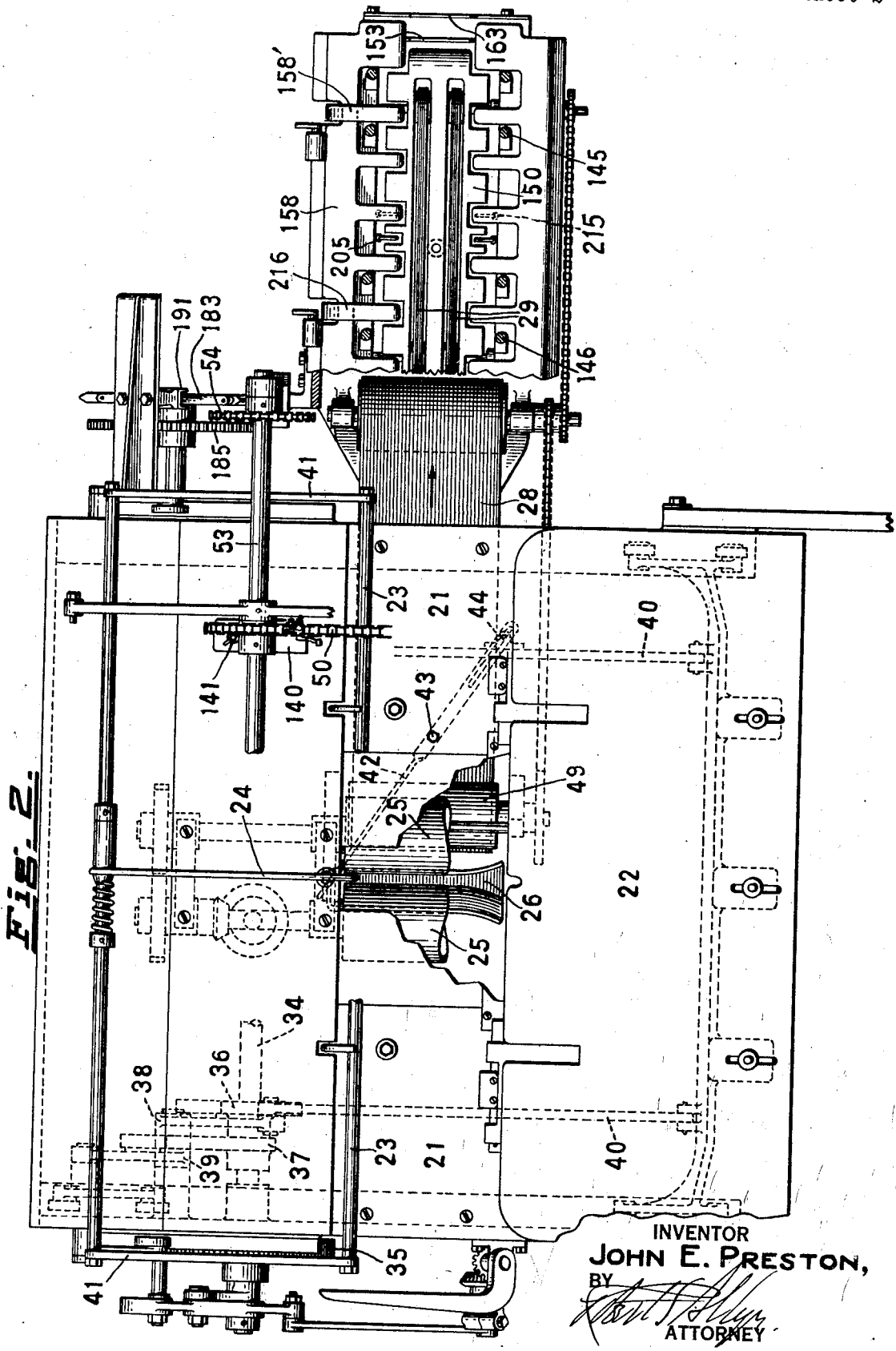
Fig. 2 is a plan view of part of the same.
Figure 3:
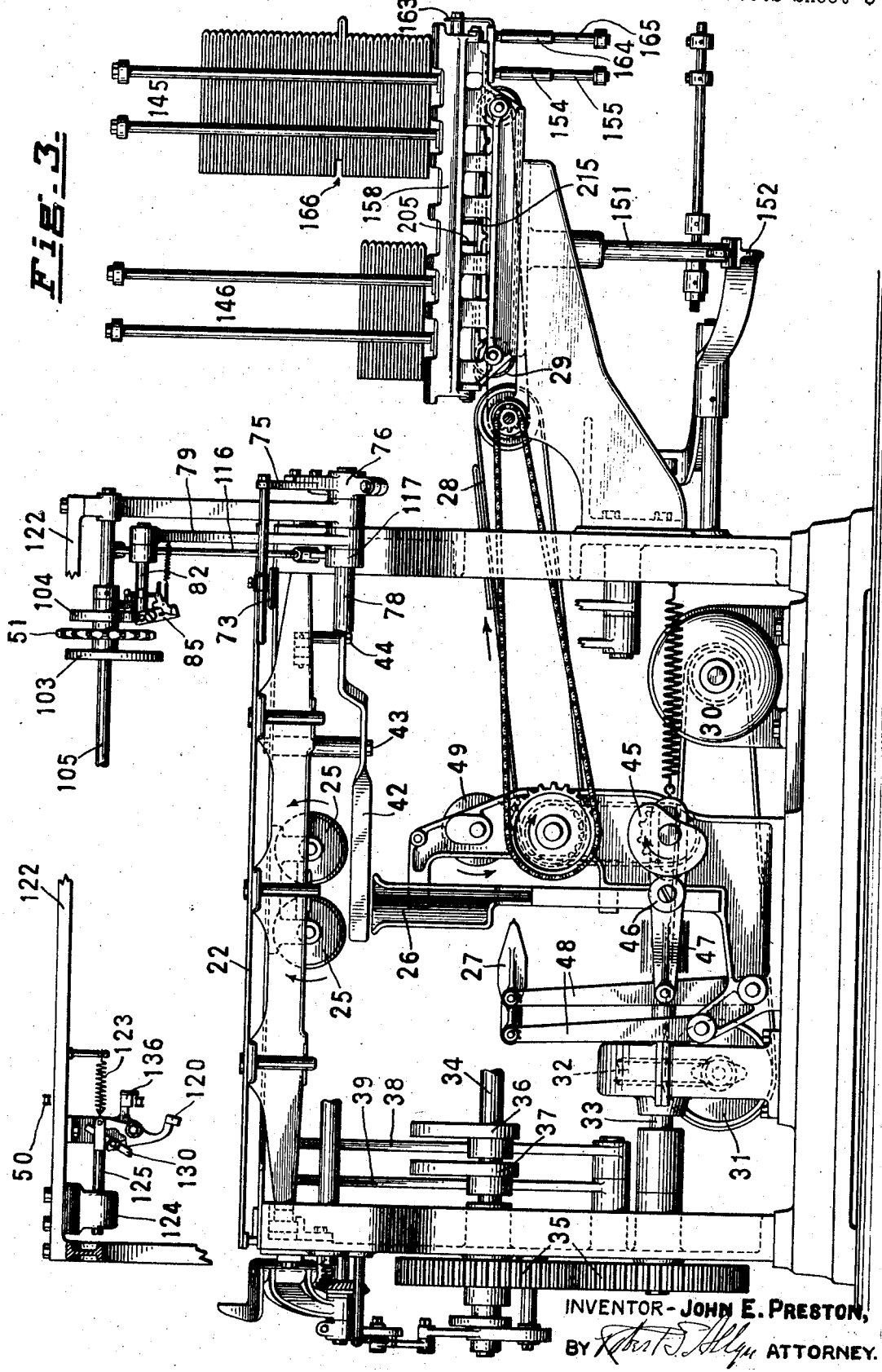
Fig. 3 is a front view of the machine showing part of the folding mechanism and part of the stacking and counting mechanism.

The stop 153 is carried by tubular members 154 which slide on rods 155. Normally one tube 154 is supported by a latch 156 which is pivoted on the shaft 157. This latch 156 is held normally in the latching position by a spring 157' so that the stop 153 is in line with the folded article which is carried onto the bottom plate 150 by the belts 29. Above the plate 150 and on each side of it is a supporting member or wing 158 which is pivoted at 159 and has fingers which alternate with fingers on the edges of the plate 150, as shown in Fig. 2. These wing plates are held in the normal position of Fig. 14 by springs 160.

When each folded article reaches the stop 153 it remains stationary allowing the belts to slip underneath for such period of time as may be necessary for other actions to take place, which will be described. When the bottom plate 150 rises it lifts the article which is touching the stop 153 and the edges of the article are pushed up between the inner edges of the opposite wing plates 158 which are lifted by the edges of the article so that the edges of the article pass above the wing plates, at which time the springs 160 pull the wing plates back into position so that when the bottom plate 150 descends the article which has just been lifted is left suspended on the inner edges of the wing plates. In other words, the folded articles are inserted successively into the bottom of the stack.

In some cases it may be desirable to count the folded articles or arrange them in predetermined groups or bundles for tieing. For this purpose I provide a second stop 163 which is supported by tubular members 164 on rods 165 similar to those previously described and at the predetermined count I actuate the latch 156 and release the stop 153 so that the folded article instead of stopping in the position determined by the stop 153 passes on to a position determined by the stop 163 and so that the article thus stopped will project beyond the line of the stack as shown at the article 166 in Fig. 3. The action of the latch 156 is controlled by the movement of a supplemental wing plate 158' which has a projection 167 adapted to engage the roller 168 on the lever 169. The lever 169 is connected by a link 170 to the ratchet lever 171 whose pawl engages the ratchet 172. This ratchet has on its inner face a projection 173 which engages one end of the lever 156. It will thus be seen that the ratchet 172 is actuated step by step by the wing plate 158. As the wing plate only operates when it receives one of the towels it is obvious that we count the actual number of towels which pass into the stack and not the strokes of the stacking plunger.

The stop 153 is reset by the plunger 151 in the same movement that raises the article which has just passed beyond the stop 153. For this purpose the plunger 151 has an extension arm 175 with a pad 176 which is adapted to engage a projection 177 which is attached to one of the tubes 154 of the stop plate 153.

When the tube 154 passes above the latch 156 the latch is reset by the spring 157'. The position of the arm 175 and the projection 177 is so designed that when the plunger 151 rises it will have lifted the folded article away from the stop 163 before the pad 176 engages the projection 177. The stop 153 is thus brought back into position before the next article can reach it. In this connection it should also be noted that the projection 173 on the ratchet 172 must have been actuated to permit the latch 156 to operate. Consequently the stop 153 can not be reset until a towel has actually passed beyond it to the stop 163 and be raised so as to actuate the wing plate 158, as previously described. Consequently there is no possibility of actuating the counter without an actual towel going into position either in the main stack or in the projected line. If the stacking mechanism does not receive a towel it does not count. The number of teeth on the ratchet 172 and the number of projections 173 will determine the number of towels in each group or bundle.

In case a towel has become torn or damaged so that it would not be desirable to stack it with the other towels it may be allowed to pass entirely through the machine by retracting stops 153 and 163 so that it will be permitted to fall into a suitable receptacle.

It will be apparent from the foregoing that other stops might be interposed in the path of the moving articles and that the articles may be arranged in one or more preceding stacks, which will be described.

It will also be obvious that if these actions are to be controlled by the operator there must be a time delay mechanism arranged to be operated automatically under the control of the operator so that the operator when inspecting the article as it goes into the machine can predetermine the final disposition of the article, regardless of the fact that several articles have preceded the one being inspected and others may follow before the selective action must take place. All of this must be controlled by an initial act on the part of the operator which requires no further attention.

In the construction shown the switch actuated by the push button 181 controls the disposition of an article to the second grade stack and the button 182 controls the disposition of the torn towels. As I have already described the stops 153 and 163 I will first trace the construction and action for disposing of the torn towels.

The delayed action mechanism includes a rotating member or wheel 183 which is driven with the other parts of the mechanism from the pinion 184 on the main drive shaft 34. This pinion meshes with the larger gear 185. This member 183 carries at its periphery a number of teeth or fingers 186, each of which is pivoted on an axis tangential to the circumference of the wheel member 183 so that it can stand in the same plane with the wheel member or may be tilted to one side or the other, as indicated by the dotted lines in Fig. 17.

Fig. 19 shows the details of one form of construction to facilitate this action. It will be seen that a spring-pressed plunger 187 has a notch which receives the tip 188 of the finger so as to hold the finger normally in its central position. Each finger has two flattened surfaces 189 inclined toward each other so that they can alternatively coact with the outer face of the plunger 187 to hold the finger in an inclined position. A lever 190 is mounted adjacent the periphery of the rotary member and provided with a channel-like shoe 191 adapted to engage the tip of a finger as the member 183 brings each finger into the vicinity of the shoe. The upper end of this lever 190 is connected to the plungers of two solenoids 192 and 193 which are in electric circuits controlled respectively by the push buttons 182 and 181. When the push button 182 closes the circuit the solenoid 192 is energized and tilts the lever 190 clockwise so that the shoe 191 will tilt to the left, as shown in Fig. 17, the finger which happens to be within the channel.

An arm 194 is carried by the rock-shaft 195. The other end of this shaft has an arm 196 with a hook member 197 which extends over the latch 156. This arm 196 and the connected hook member are normally biased by the spring 198. The latch 156 normally holds up the supporting plates 154 and 164 but the extent of engagement of the hook member is such that the latch member 156 may be retracted by the action of the counter previously described, sufficiently to release the supporting plate 154 without releasing the supporting plate 164. When the push button 182 is actuated, however, the solenoid 192 tilts the lever 190 and throws the finger 186 to the left where it stays for the time being. When the delay action member 183 has revolved far enough to bring the tilted finger against the arm 194, the shaft 195 with the attached rocker arm 196 and hook member 197 will be operated so as to pull out the latch 156 and permit both of the stop member supporting plates 154 and 164 to drop, thus retracting the stops 153 and 163. It is obvious, therefore, that the next towel that arrives in the stacker will pass right on through without being held up and without being stacked and will fall onto the floor or into a suitable receptacle if one is provided.

As soon as the torn towel has passed through the machine the rising of the plunger 151 will cause the pad 176 to engage and lift the lower end 177 of the plate 154 and reset the stop 153. At the same time the pad 199 on the arm 175 will engage the lower end 200 of the other supporting plate and reset the stop 163.

The latch member 156 being under the tension of the spring 157' will be interposed beneath the edges of the plates 154 and 164 and hold them in their elevated positions. The finger 186 which has caused the ejecting action of the torn towel is reset by its engagement with the inclined cam member 201 as the wheel 183 rotates.

The stop mechanism for causing the second grade towels to be fed into the bottom of the stack 146 is set in a similar manner by first pressing the push button 181 which controls the circuit of the solenoid 193. The spring 202 which is connected to the upper end of the lever 190 serves to return the lever and attached solenoid plungers to the neutral position when the solenoids are de-energized. The arm 203 is carried by the rock shaft 204 in a position to be engaged by any one of the fingers 186 when it has been tilted to the right by the action of the solenoid 193 and the shoe 191.

Stack 146 has two sets of stops 205 and 215 for the folded articles, corresponding generally to the stops 153 and 163 (see Figs. 13 and 16.) These stops are arranged in pairs and pivoted so as to swing outwardly and inwardly with respect to the conveyor belts 29. The stop plates 205 are carried by levers which are pivoted on the stud 206. These stop levers have arms 207, 207 which have a pin and slot connection 208 which causes the two stop levers to operate together. A latch 209 normally engages a projection 207' on one of the stop levers to hold it in the retracted position so that the stop plate is retracted out of the path of movement of the towels as they travel through the stacker.

The spring 210 which is connected to one of the stop levers tends to bias the stop levers and their plates into the stopping position which is, as above mentioned, normally resisted by the action of the latch 209. The shaft 204 has an arm 211 connected by a link 212 to the latch 209. When the push button 181 is depressed the solenoid 193 is actuated and tilts the lever 190 so that the shoe 191 tilts the engaged finger 186 toward the right as viewed in Fig. 17. When this deflected finger strikes the arm 203 it rocks the shaft 204 and the attached arm 211 and thus retracts the latch 209 so that the spring 210 can tilt the stop levers into the position shown in dot and dash lines in Fig. 16. The upper ends of these stop levers or plates are thus interposed in the path of the approaching towel which is stopped in a predetermined position to be inserted into the bottom of the stack on the lifting stroke of the bottom plate 150 which then takes place. The action of the wing plates 158 is the same as that previously described with respect to stack 145. As the plunger 151 rises the projection 213, which is carried by it, engages beneath the connected ends of the lever arms 207 and tilts them so as to retract the stop plates which are then caught by the latch 209, previously described, and held retracted until the operator again actuates the push button switch 181.

The cam 214 which is opposite the cam 201 serves to automatically re-center any finger 186 which has been previously tilted to the right.

The second pair of stop plates 215 are constructed and operated in a manner similar to the stop plates 205 except that their action is for the purpose of dividing the stack into bundles of a predetermined number. For this purpose counting mechanism is provided which, after a predetermined number of towels have been inserted in the stack 146, will automatically prevent the stops 205 from acting and the stops 215 will be actuated. This counting mechanism includes a tilting wing member 216 which is actuated by each towel as it passes into the stack 146. A plate 217 connected to this wing plate lever coacts with a roller on the outer end of the lever 218. The latter lever is connected by a link 219 to the pawl arm 220. Every time this pawl arm is oscillated it turns the ratchet 221 one tooth. A latch lever 222 has one end in the form of a hook to engage a hook 205' on one of the stop levers 205. The other end of this latch lever projects into the path of movement of a projection 221' which is carried by the ratchet 221. Consequently after a predetermined number of operations of the wing lever 216 the ratchet member 221 and its projection 221' will actuate the latch lever 222 and engage the hook 205' of the stop lever 205 so as to prevent the operation of that stop lever and its mate on the other side of the stack. The result will be that the next towel which comes along on the conveyor 29 will continue until it strikes the stop plates 215 which are constructed and operate in a manner similar to the construction and operation of the stop levers 205 except for this locking-out feature.

It will thus be seen that that particular towel projects beyond a line of the other towels in the stack and serves as an indication of the proper point of separation of the bundles.

As soon as the projection 221' passes the nose of the latch lever 222 the latch lever will be tilted in a suitable manner as for instance by a spring (not shown) so as to retract the inner end from the hook 205' and thus leave the stop members 205 free to act in response to the next action of the push button 181.

From the foregoing it will be seen that the disposition or segregation of the respective towels is under the manual control of the operator who inspects the towels as they are automatically picked up and fed into the machine. If the operator decides that a towel is soiled or needs to be washed over again she merely presses the push button 127 which actuates the solenoid 124 and the release device 120 which automatically disengages the washover without any further attention on the part of the operator.

If the towel is in first class condition no action on the part of the operator is required. The towel is automatically carried into the folding mechanism, folded and conveyed to the stacker where it is automatically placed in the bottom of stack 145.

When a predetermined number of first class articles have been inserted in stack 145 the counting mechanism automatically causes the next article to be projected beyond the edge of the other articles in the stack to denote a line of division.

If the operator notices a torn or damaged towel which should not be stacked with the other towels she presses push button 182 which sets in motion the delayed action mechanism for retracting the stops of stack 145. In the particular machine described there may be at one time six towels in various positions in addition to the one being inspected, namely, three towels carried by the conveyor, one on the folding table being folded lengthwise, one in the chute receiving the cross fold, and one on the conveyor belt approaching the stacker. The delayed action mechanism is accordingly provided with eight of the selective fingers, six of which may be termed active and represent towels in the machine whose segregation is determined by the position of the respective fingers and their possible subsequent operation. The other two fingers represent the time required to re-center the previously set fingers.

It should be understood that additional stacks might be provided controlled in a similar manner and that the length of the conveyor chains and the number of sets of grippers carried by it might be increased or decreased, in which case a corresponding increase or decrease in the number of active fingers would be required.

In the mechanism described the conveyor chains are operated continuously when the machine has once been started. The operator is thus able to concentrate attention upon the alignment of the towels to be picked up and the inspection and classification or segregation according to some predetermined instructions.

This construction and arrangement greatly increases the possible speed of the machine and the accuracy of inspection since the operator does not have to perform any pick-up motion and since the action of the mechanism is timed automatically.

Another feature of considerable importance is the automatic clearing action which removes from the folding mechanism any towel which may become jammed in the folder. While this by itself seems a simple feature it should be borne in mind that whenever an article does get jammed in the machine it may tie up the operation of the machine for a considerable period of time.

The mechanism also to a maximum degree avoids the possibility of injury to the operator since it is unnecessary to come into contact with any part of the folding mechanism.

I claim:

1. In a folding machine, pick-up means permitting inspection of articles, conveying means receiving articles from the pick-up means, means for folding articles, means for removing the articles from the conveying means and delivering the articles to the folding means, means for automatically removing articles which may become jammed in the folding means, a number of stacking devices, means for transferring folded articles from the folding means to the stacking devices and means controlled by the operator for throwing out articles to be rewashed and for predetermining to which stacking device the folded articles will be transferred.

2. In a folding machine, pick-up means permitting inspection of articles, conveying means receiving articles from the pick-up means, means for folding articles, means for removing the articles from the conveying means and delivering the articles to the folding means, means for automatically removing articles which may become jammed in the folding means, a number of stacking devices, means for transferring folded articles from the folding means to the stacking devices and means controlled by the operator for predetermining to which stacking device the folded articles will be transferred.

3. In a folding machine, pick-up means permitting inspection of articles, conveying means receiving articles from the pick-up means, means for folding articles, means for removing the articles from the conveying means and delivering the articles to the folding means, a number of stacking devices, means for transferring folded articles from the folding means to the stacking devices and means controlled by the operator for predetermining to which stacking device the folded articles will be transferred.

4. In a folding machine, pick-up means permitting inspection of articles, conveying means receiving articles from the pick-up means, means for folding articles, means for removing the articles from the conveying means and delivering the articles to the folding means, means for automatically removing articles which may become jammed in the folding means, a number of stacking devices, and means for transferring folded articles from the folding means to the stacking devices.

5. In a folding machine, means for ejecting articles to be rewashed, means for folding articles, means for delivering the articles to the folding means, a number of stacking devices, means for transferring folded articles from the folding means to the stacking devices and means controlled by the operator for predetermining to which stacking device the folded articles will be transferred.

6. In a folding machine, means for folding articles, means for delivering the articles to the folding means, means for automatically removing articles which may become jammed in the folding means, a number of stacking devices, means for transferring folded articles from the folding means to the stacking devices and means controlled by the operator for throwing out articles to be rewashed and for predetermining to which stacking device the folded articles will be transferred.

7. In a folding machine, means for folding articles, means for automatically removing articles which may have become jammed in the folding means, and means controlled by an operator for segregating folded articles into classes.

8. In a folding machine, the combination of conveying grippers for carrying articles to be folded, means for releasing the grippers, means adapted to be actuated by an operator to set said means in position to release an article, a latch device for holding the release means in its actuating position, and means actuated by the passage of the conveying grippers for releasing the latch device and retracting said release means.

9. Pick-up mechanism for a folding machine comprising vertically movable means including arms having contact feet and levers carried by said arms and having points for protruding through said feet, latching means coacting with said arms and said levers, and means actuated by the lifting of said members to release said latching means.

10. In a folding machine, a stacking device having multiple stops, means for feeding folded articles in the machine to engage said stops, means for at will retracting one or more of said stops, and means for automatically resetting said stops.

11. A stacking device for a folding machine comprising a stacker, means for feeding folded articles successively to the bottom of the stack, a stop for normally determining the position of folded articles in the stack, means actuated by the articles as they pass into the stacker for retracting said stop after a predetermined number of articles have passed into the stacker.

12. In a folding machine means for classifying movable articles including spaced stop members, a rotating member having fingers adapted to be moved to either side of the central plane of said member, mechanism for controlling said stop members adapted to be actuated by said fingers, and means controlled by the operator for setting said fingers.

13. In a folding machine, means for folding articles, means for delivering articles to the folding means, means for automatically removing articles which may become jammed in the folding means, a stacking device, means for transferring folded articles from the folding means to the stacking device, means controlled by the operator for throwing out articles to be rewashed and means for diverting articles from the stacking device.

14. In a folding machine, a plurality of stacking devices, means for controlling the passage of folded articles into either stacking device and means actuated by the movement of a folded article for counting the articles inserted into each stack independently.

15. In a folding machine, means for ejecting torn articles, means for removing articles to be rewashed, and means for stacking first class folded articles.

16. In a folding machine, folding devices, conveyors having edge gripping devices travelling to the folding devices, means for picking up the edge of an article on a pile and transferring the article to said edge gripping devices, means for ejecting imperfect articles before they reach the folding devices and means for conveying folded articles away from the folding devices.

17. In a folding machine, folding means, a conveyor for carrying successive articles to the folding means, a stacking device, means for conveying folded articles to the stacking device, means for ejecting an article before it can reach the folding means, means for removing a jammed article after partial folding and before stacking and means for removing a torn article after folding.

18. In a folding machine, folding means, a conveyor for carrying successive articles to the folding means, a stacking device, means for conveying folded articles to the stacking device, means for ejecting an article before it can reach the folding means, means for removing a jammed article after partial folding and before stacking, and means for removing a torn article after folding, and means under the control of an operator for actuating the ejecting means and the removing means when desired.

19. In a folding machine, folding devices, means for successively feeding articles to the folding devices, a plurality of stacking devices arranged successively, means for conveying folded articles from the folding devices past one stacking device to the other stacking device, means controlled by an operator for determining before the article is folded to which stacking device the folded article is to go.

20. In a folding machine, folding devices, means for successively feeding articles to the folding devices, a plurality of stacking devices arranged successively, means for conveying folded articles from the folding devices past one stacking device to the other stacking device, means controlled by an operator for determining to which stacking device the folded article is to go and means for ejecting a folded article without stacking and without stopping the other operations of the machine.

JOHN E. PRESTON.